United States Patent [19]
Dorf

[11] 3,869,933
[45] Mar. 11, 1975

[54] STRUCTURES OF REINFORCED ELASTOMERIC MATERIAL

[75] Inventor: Marvin L. Dorf, Bleary-Lurgan, Northern Ireland

[73] Assignee: The Goodyear Tire & Rubber Company, Akron, Ohio

[22] Filed: Nov. 2, 1973

[21] Appl. No.: 412,072

[30] Foreign Application Priority Data
Nov. 14, 1972 Great Britain.................... 52640/72

[52] U.S. Cl. ................................................ 74/234
[51] Int. Cl. ............................................. F16g 5/00
[58] Field of Search....................... 74/234; 156/137

[56] References Cited
UNITED STATES PATENTS
2,442,037  5/1948  Carter et al.................... 74/234 UX Primary Examiner—Leonard H. Gerin
Attorney, Agent, or Firm—F. W. Brunner; R. H. Hatton

[57] ABSTRACT

A V-belt construction in which the tensile or strength member extending longitudinally of the belt is positioned centrally of the belt section. This permits the individual belts to be cut from the vulcanized slab without waste by alternating angle cuts so that the belts are alternately right side and wrong side out. The wrong side out belts are then merely turned inside out to provide the finished belts. Substantially all waste is eliminated in making belts by this method.

10 Claims, 5 Drawing Figures

STRUCTURES OF REINFORCED ELASTOMERIC MATERIAL

This invention relates to so-called V-belts, that is to say transmission belts of generally truncated triangular cross-section and having embedded therein a high tensile reinforcing layer extending in the direction of and around the belt. Belts of this kind are generally manufactured by building first of all a wide flat continuous belt comprising the elastomeric body material with the high tensile reinforcement at a suitable depth therein, followed by cutting the resulting flat belt into relatively narrow strips. In virtually all satisfactory V-belts as manufactured heretofore, the high tensile reinforcement has been located eccentrically, and the required V-shape obtained by cutting triangular sections of waste stock in such a way that the aforesaid high tensile reinforcement is always located towards the wide face of the resulting V-belts. In other words the V-belts are cut so as to face all in the same direction from the parent flat belt, with inevitable generation of a substantial amount of waste or scrap elastomer. Proposals have been made to adopt a so-called balanced cut belt, in which the high tensile reinforcement is located centrally of the belt section and the parent flat belt is cut at an angle which alternates between a left hand and right hand inclination to the belt axis so that the resulting alternate V-belts as cut face alternatively inwardly and outwardly, alternate belts then being turned inside out to provide a set of notionally identical belts without waste. However, the performance of this type of belt has not been satisfactory with particular reference to its seating in the eventual transmission pulley.

It is an object of the present invention to provide an improved construction of balanced cut V-belt.

The invention consists in a V-belt, having a cross-section exhibiting a symmetrical construction about a central line corresponding to a median plane of the belt mid-way between its wide and narrow faces, the annular high tensile reinforcement of the belt being located at this central plane and being sandwiched between layers of a fabric bracing material having high compressive and tensile moduli transversely of the belt.

By virtue of the symmetrical construction the belt can be cut from a parent flat belt in a balanced manner as already described i.e., without waste, alternating V-belts being turned inside out. The layers of bracing material serve to enhance very substantially the resistance of the belts to sagging in the eventual transmission pulley which has been a serious defect of prior balanced cut V-belts.

In general, the belt will comprise one or more fabric plies at or adjacent the inner and outer faces which are of a nature to afford a substantial degree of stretch under conditions of use to which end the fabric may be woven and laid on the bias. Desirably the inherent stretch of these inner and outer plies when used will be at least 7 percent, and preferably at least 10 percent.

The main body of the belt, of so-called cushion stock may have a conventional orientated fibre reinforcement in which the fibres lay mainly crosswise of the belt and enhance its sideways rigidly, still leaving the belt flexible in the longitudinal direction so that it can bend readily around smaller pulleys.

Between the two layers of bracing material (which may each be made up of one or more plies of suitable fabric) the high tensile reinforcement will be embedded in a body of elastomer. This may also be optionally fibre-loaded, orientated-fibre loaded with the fibres lying mainly crosswise of longitudinally of the belt. Stock of a relatively high durameter hardness is preferred. This so-called insulation stock will suitably be formulated to give good adhesion to the tensile reinforcement and to the bracing material.

The high tensile reinforcement can be any of the various continuous filament fibres known for this purpose such as glass, nylon, polyester, fibre B or Nomex twisted into what is commonly known as cable cord or it can take the form of monofilament the diameter of which can be anywhere from 0.020 to 0.150 inch depending upon the cross sectional size of the belt. This cord may be dipped and heat processed in a known manner to give it a high tensile modulus such that it will yield a low stretch belt. The dipping and heat treatment serve to unify the cord with a suitable (usually) cured elastomeric or plastomeric impregnant.

The bracing material can comprise various kinds of synthetic yarn fabric comprising macrofilament, monofilament, filament or staple yarns usually of the so-called tyre cord classification dipped and heat treated in such a manner to impart both a high tensile and a high compression modulus. This bracing material is placed during building up of the parent belt in such a manner that the high tensile and high compression properties are manifested crosswise of the belt. In the case of a fabric having similar size yarn in warp and weft, with similar high tensile and compression modulus, the material is preferably placed on the bias.

V-belts in accordance with the invention can be provided in a wide range of sizes ranging for example from miniature belts of ¼ inch top width to large belts of up to 4 inch top width although the invention is particularly useful in connection with belts of about ⅜ inch – ½ inch top width for automotive use. The distance between the bracing material and the central high tensile member will depend on the size of the belt cross-section but may generally vary from a few thousandths of an inch to 0.150 inch. In the larger belts there may be two or even three layers of bracing material on each side of the tension member.

The invention will be described further with reference to the accompanying drawings in which.

Figure 1:
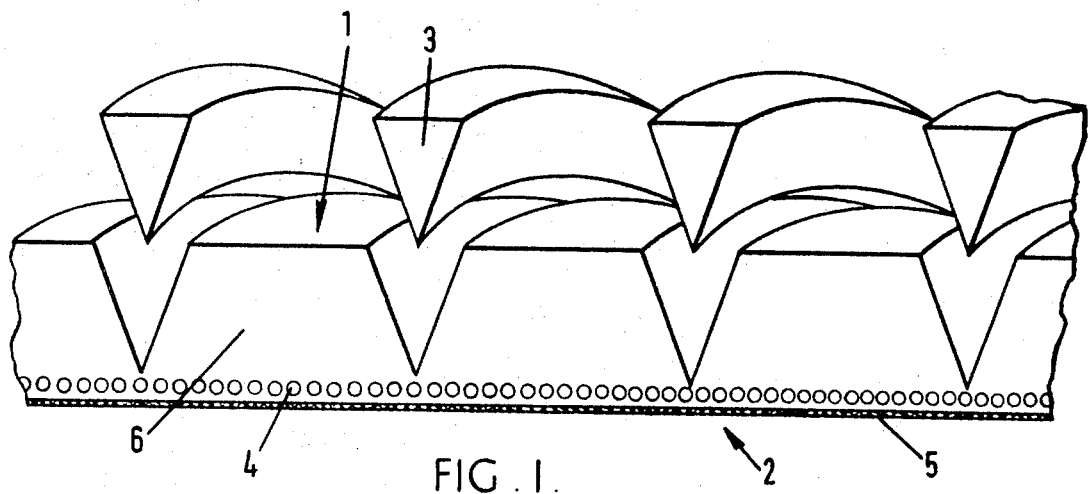
FIG. 1 illustrates a conventional mode of making a V-belt.
Figure 2:
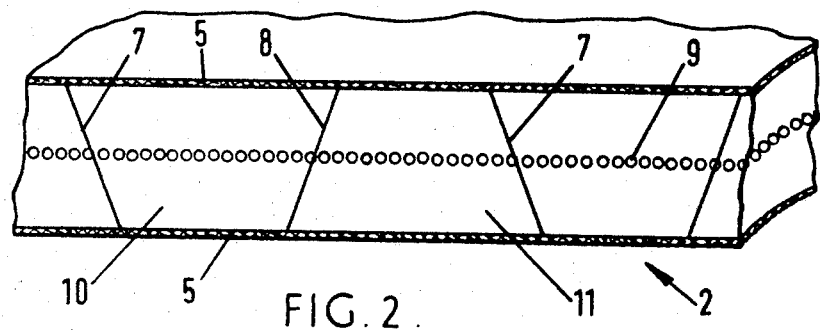
FIG. 2 shows the lay out of a balanced cut.

The prior art V-belt has been cut from a parent flat belt generally indicated at 2 by the removal of spaced portions 3 of triangular section. The high tensile reinforced layer 4 has been spaced relatively closely to a fabric cover 5 on the wide face of the belt the balance being essentially cushion stock 6. The cut-out sections 3 have in general been waste scrap. Even in cases where the cuts are made into the uncured rubber reuse of the cut away portions has been difficult especially in the case of orientated fibre reinforcing cushion stock. FIG. 2 shows how the balanced cut belt is made, alternate cuts 7 and 8 being at opposite orientations to the median plane 9 of the belt where in this case the high tension reinforcement is located. A like fabric layer 5 is of course to be provided at each side of the belt 2 (assuming such layer is used at all) since alternate belts 10 and 11 must be of the same construction and belt 11 has to be turned inside out.

Figure 3:
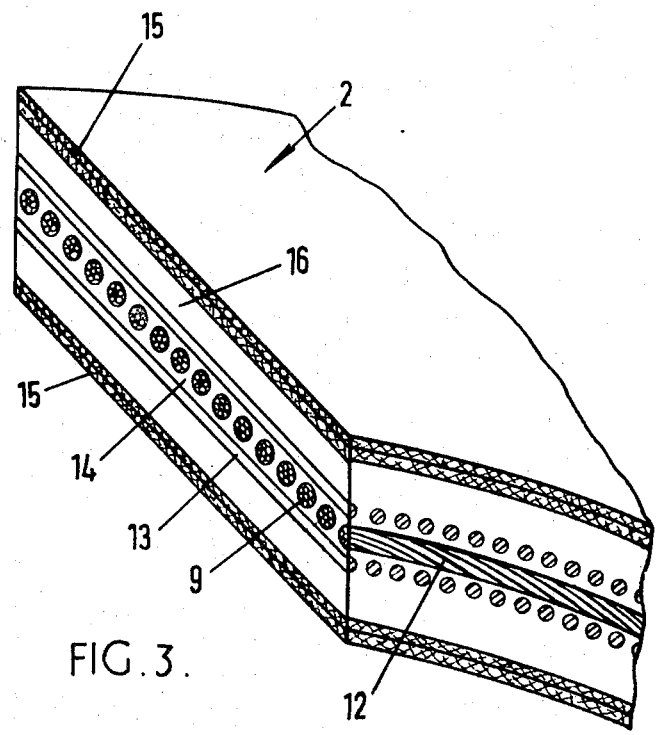
FIG. 3 shows the internal construction of a parent belt from which V-belts according to the invention may be cut.
Figure 4:
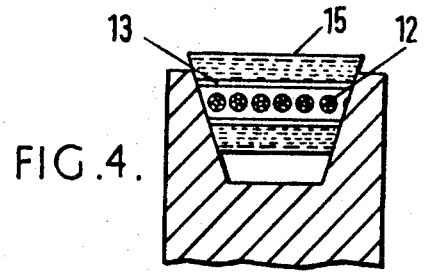
FIG. 4 shows a cross section of a belt according to the invention seated in a transmission pulley and FIG. 5 is similar to FIG. 4 but showing the effect of omitting the bracing member.

Referring now to FIG. 3, the belt 2 from which V-belts in accordance with the invention and as shown in FIG. 4 will be cut is of symmetrical construction about the median plane 9 where the high tensile reinforcement is located, consisting of the high tensile cords 12. In building the flat belt 2 these high tensile cords 12 will normally be wound helically so they extend continuously around the belt. Closely adjacent each side of the layer of the cords 12 is a bracing layer 13 these three layers being bonded together by a body of reinforced elastomer 14 of insulation stock as already described. The outer faces of the belt 2 comprise bias cut fabric plies 15; between the plies 15 and the bracing material 13 is a body of cushion stock 16.

Figure 5:
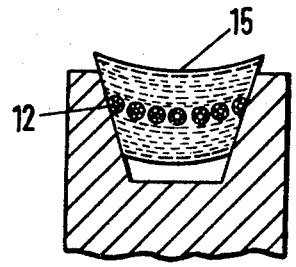

FIG. 4 which is self explanatory shows a V-belt in accordance with the invention seated in a transmission pulley under tension. FIG. 5 shows the same general construction, except that the bracing layers 13 are omitted, with resultant loss of transverse stiffness and consequential sagging of the belt towards the bottom pulley. This sagging is of course largely a result of the location of the reinforcing cord at a position remote from the outer face of the belt, so that less cord is directly supported by the pulley walls.

A further advantage of V-belts in accordance with the invention is a greatly reduced tendency to "turn over" in the pulley groove, as compared with a conventional belt, at high speeds, with cyclic loads or on mule drives.

I claim:

1. An endless V-belt structure having top and bottom surfaces and side driving faces extending therebetween, said belt comprising a body portion of elastomeric material and having a tension member therein midway between the top and bottom surfaces of said belt and at least one fabric reinforcing layer symmetrically positioned on each side of said tension member between said tension member and the top and bottom surfaces of said belt, said reinforcing layers having high compressive and tensile moduli in the transverse direction of the belt whereby the V-belt is of a symmetrical construction about said tension member.

2. A belt as claimed in claim 1 in which the top and bottom surfaces of the belt are formed of at least one ply of fabric stretachable along the length of the belt.

3. A belt as claimed in claim 1 in which at least a portion of the body of said belt is formed of fiber-loaded elastomeric material.

4. A belt as claimed in claim 1 in which the tension member is formed of a continuous helically wound cord positioned between the fabric reinforcing layers.

5. A belt as claimed in claim 1 in which said reinforcing layers are formed of heat treated filamentary material extending substantially transversely of the belt.

6. The method of making an endless V-belt structure having top and bottom surfaces and side driving faces extending therebetween, said method comprising the steps of forming a sleeve on a mandrel, vulcanizing said sleeve and cutting said sleeve to form the V-belts, said sleeve being of symmetrical construction throughout its thickness and formed of a layer of elastomeric material, a strength member positioned on said elastomeric material and having a fabric reinforcing layer symmetrically arranged on each side thereof, the reinforcing members having high compression and tension moduli in the longitudinal direction of said sleeve, and a second layer of elastomeric material of substantially the same thickness as said first layer positioned over said strength member whereby the strength member lies midway between the inner and outer surfaces of said sleeve.

7. The method as claimed in claim 6 in which a layer of stretchable fabric forms the inner and outer surface of said sleeve.

8. The method as claimed in claim 6 in which the vulcanized sleeve is cut at an angle with the alternate cuts being at same but opposite angle to the surface of the sleeve to form the driving faces of the V-belt.

9. The method as claimed in claim 8 in which the cuts are equally spaced at the center of the strength member whereby every other belt is right side out and the alternate belts must be turned inside out for the operating position and then are substantially identical to the right side out belts.

10. The method as claimed in claim 6 in which the strength member is a continuous helically wound cord and is cut on a long shive angle as the belt is cut from the sleeve.

* * * * *